United States Patent

Meslener

[15] 3,670,249

[45] June 13, 1972

[54] SAMPLING DECODER FOR DELAY MODULATION SIGNALS

[72] Inventor: George John Meslener, Acton, Mass.

[73] Assignee: RCA Corporation

[22] Filed: May 6, 1971

[21] Appl. No.: 140,886

[52] U.S. Cl. ....................328/110, 307/269, 328/163

[51] Int. Cl. ....................H03k 9/04

[58] Field of Search ....................328/163, 164, 109, 110, 114, 328/139; 307/236, 269, 233; 329/126, 128

[56] References Cited

UNITED STATES PATENTS

| | | | |
|---|---|---|---|
| 3,191,013 | 6/1965 | Reader | 328/109 |
| 3,244,986 | 4/1966 | Rumble | 328/109 |
| 3,490,049 | 1/1970 | Choquet et al. | 329/126 |
| 3,473,163 | 10/1969 | Conant | 307/269 |
| 3,159,793 | 1/1964 | Welsh | 328/58 |

*Primary Examiner*—Donald D. Forrer
*Assistant Examiner*—Harold A. Dixon
*Attorney*—H. Christoffersen

[57] ABSTRACT

A decoder is disclosed for an input delay modulation information signal in which a transition occurs at the center of a bit cell containing a "1" and a transition occurs at the boundary between two successive bit cells containing "0s." The polarities of the information signal a quarter of a bit cell prior to and a quarter of a bit cell following the center of a bit cell are compared and a first decoded signal is generated when the polarities are different. The polarities of the information signal at the beginning and end of a bit cell are compared and a second decoded signal is generated when the polarities are different. The first and second decoded signals are applied to an "and" gate to produce an NRZ output signal.

4 Claims, 5 Drawing Figures

INVENTOR
George J. Meslener.
BY
Carl V. Olson
ATTORNEY

INVENTOR
George J. Meslener.
BY
Carl V. Olson
ATTORNEY

INVENTOR
George J. Meslener.
BY
Carl V. Olson
ATTORNEY

SAMPLING DECODER FOR DELAY MODULATION SIGNALS

BACKGROUND OF THE INVENTION

This invention relates to digital information code converters or decoders for translating an information signal in one form especially suited for magnetic recording to another form especially suited for handling by electronic circuitry. A known form of signal for recording is a self-clocking type signal in which a transition occurs in the middle of a bit cell representing a "1" and a transition occurs between bit cells representing two successive "0s."

The above-described signal is in a form or code which is particularly well suited for use in serial type magnetic recording and reproducing systems. This is so because the signal itself includes transitions which, when the signal is reproduced, can be extracted to produce a clocking or timing wave, and because the signal includes relatively few transitions so that information can be densely packed on the recording medium. A decoder or converter is normally used to translate the signal reproduced from the recording medium to a simple non-return-to-zero (NRZ) signal and a clock pulse wave suitable for application to the signal input and the shift input, respectively, of a conventional shift register.

A digital information signal in which a "1" is represented by a transition in the middle of a bit cell (a "0" is represented by the absence of a transition at the middle of a bit cell), and in which two successive bit cells both containing "0"s are separated by an intervening partition or clock transition, is sometimes called a delay modulation signal. This is because the decoder includes means to compare the signal with a delayed version of the signal to determine whether there was an intervening transition. The assignment of "1" and "0" meanings is purely arbitrary and may be reversed. The coding system herein called "delay modulation" is also known as "-modified frequency modulation" and "time modulation."

Decoders for translating a delay modulation signal read from a magnetic medium to an NRZ signal suitable for use by a computer processor are described in U.S. Pat. No. 3,414,894, issued on Dec. 3, 1968 to G. V. Jacoby and U.S. Pat. No. 3,452,348 issued on June 24, 1969 to J. A. Vallee. While decoders of the type described are satisfactory, a demand exists for decoders capable of responding with high accuracy to signals derived from magnetic mediums on which information is ever more densely packed, such as at a density of 4,400 bits per inch of magnetic track on a disc or drum.

SUMMARY OF THE INVENTION

According to an embodiment of the invention, an input signal derived from a delay modulation magnetic recording is sampled to detect a 1-indicating polarity transition at the center of the bit cell. The signal is also sampled to detect a polarity difference between the beginning and end of a bit cell for the purpose of suppressing an erroneous 1-indicating output when a "0" bit occurs between two "1" bits.

Figure 1:
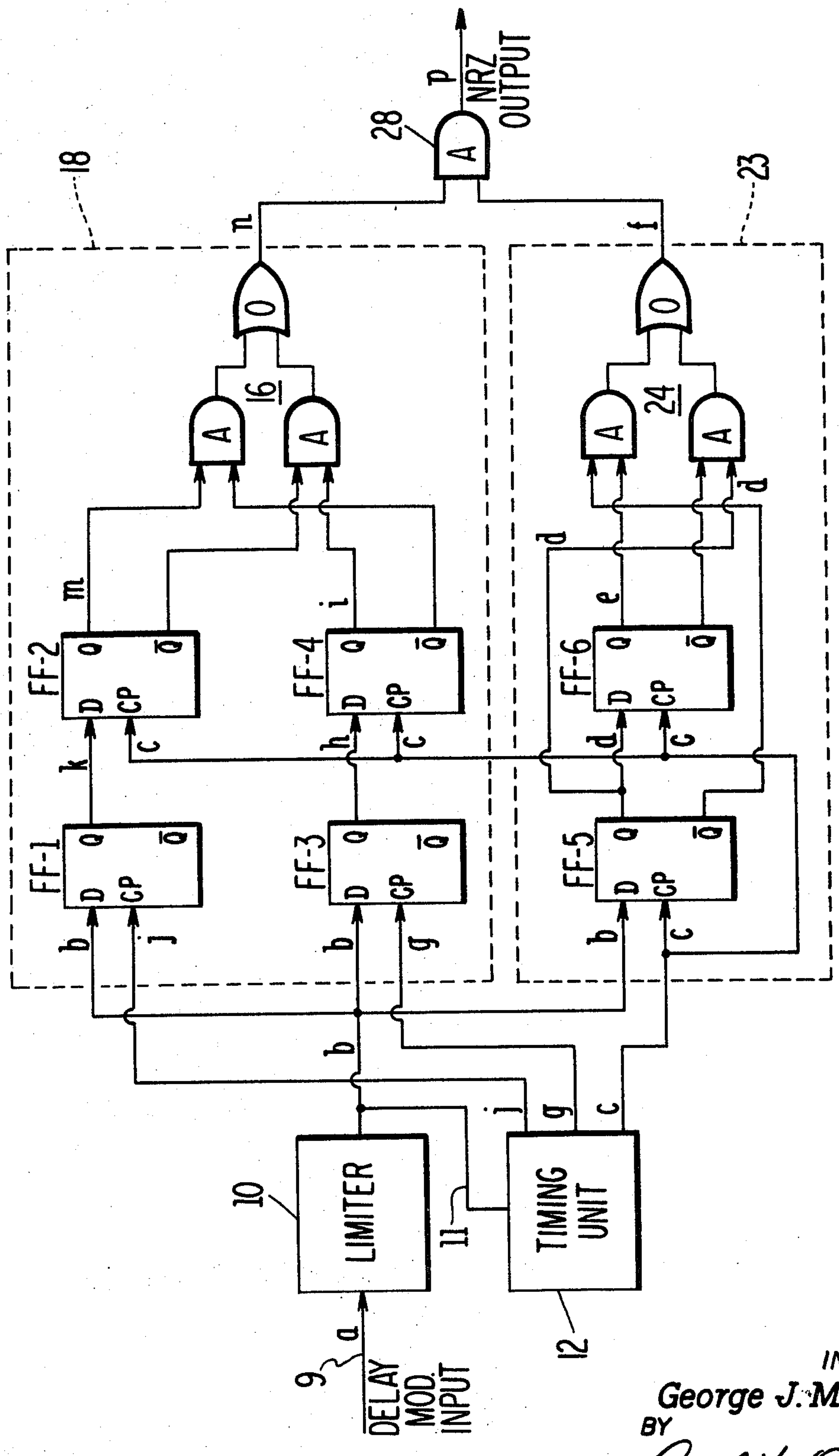
FIG. 1 is a schEmatic diagram of a decoder constructed according to the teachings of the invention.
Figure 2:
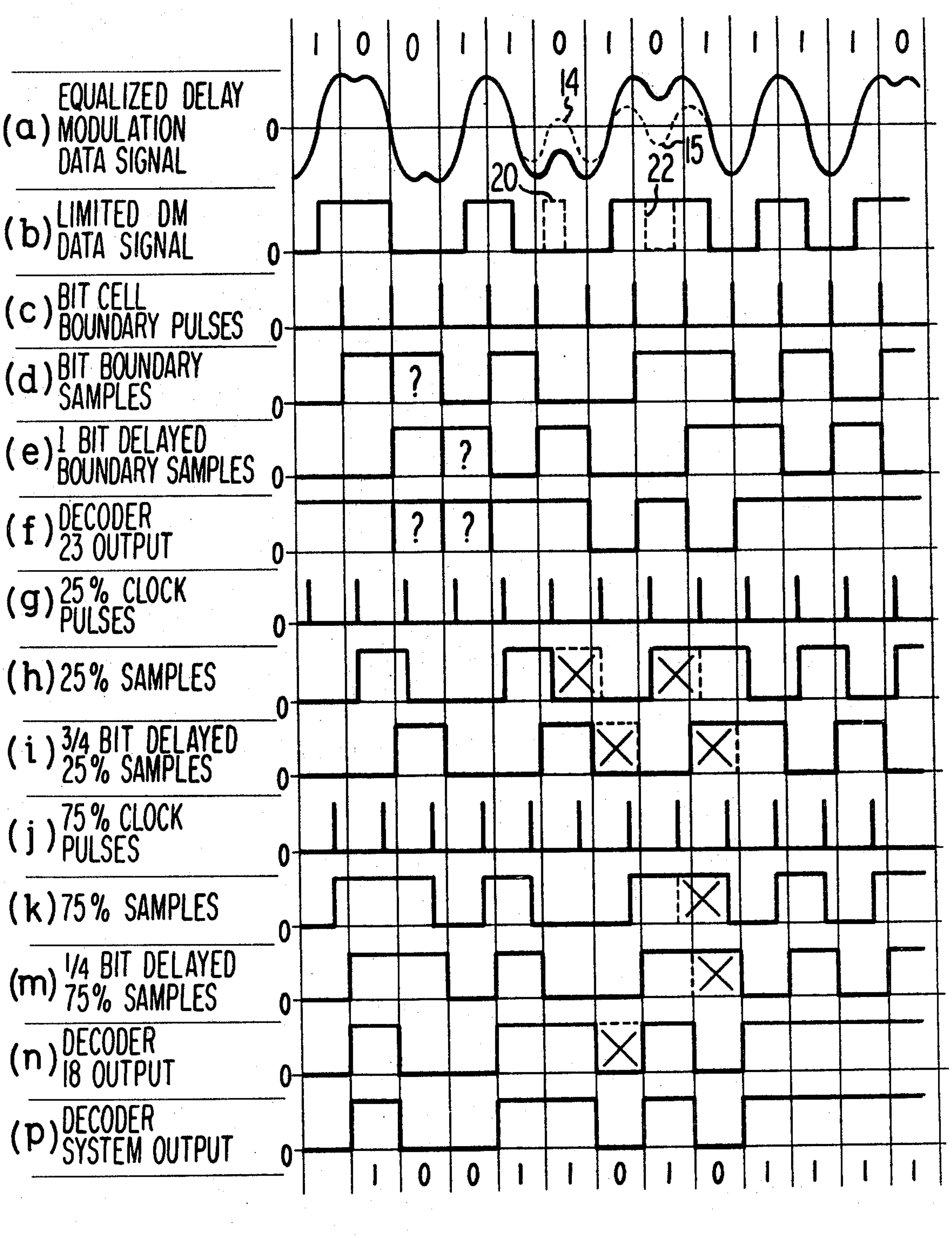
FIG. 2 is a set of voltage waveforms which will be referred to in describing the operation of the decoder of FIG. 1.

DESCRIPTION OF FIGS. 1 and 2

FIG. 1 is a decoder schematic diagram containing alphabetic characters at points in the circuit where correspondingly lettered voltage waveforms are shown in FIG. 2.

An input delay modulation information signal derived from a magnetic recording medium is present on input line 9 and has an exemplary wave shape as shown in FIG. 2*a*. The waveform is shown to be one in which a zero-crossing transition occurs at the middle of each bit cell containing a "1," and at the boundary between two bit cells containing "0s." The input signal is an equalized signal with high-frequency emphasis so that the zero-crossings of the signal waveform are accurately positioned in relation to the centers and edges of the bit cells.

The input signal is applied to a limiter 10 which has a threshold set at ground or zero potential. The input signal is balanced with respect to ground and is a-c coupled to the limiter. The limiter 10 then provides an output wave shown in FIG. 2*b* in which the output voltage is high during those time periods when the input signal is positive or above the zero voltage reference line. The output of limiter 10 is applied over line 11 to a conventional timing extraction unit 12 including a phase-locked oscillator. The timing unit generates bit cell boundary clock pulses c as shown in FIG. 2*c*, 25 percent clock pulses *g* at the 25 percent points in the bit cells as shown in FIG. 2*g*, and 75 percent clock pulses *j* occurring at the 75 percent points in the bit cells as shown in FIG. 2*j*.

The decoder of FIG. 1 includes six flip-flops FF–1 through FF–6, which may be D-type $T^2L$ flip-flops, for example, those manufactured by several suppliers under the designation SN74H74. The D flip-flops are constructed so that the output signal at terminal Q becomes the same as the input signal at input terminal D at the time that the positive leading edge of a clock pulse is applied to the clock pulse terminal CP of the flip-flop. The flip-flop remains in the condition to which it is thus set until the appearance of the positive leading edge of a next following clock pulse. The clock pulses *c*, *g* and *j* are shown in FIG. 2 as spikes. However, the spikes represent the leading edges of clock pulses which may have a width which is small in relation to the bit cell period.

The limited information signal b from the limiter 10 is applied to the signal input terminal D of flip-flop FF–1. The clock pulses *j* occurring at the 75 percent points in the bit cells are applied to the clock pulse input CP with the result that the output *k* from flip-flop FF–1 is as shown by waveform *k* in FIG. 2. The output *k* is applied to flip-flop FF–2 together with cell boundary clock pulses *c*, with the result that the output *m* from flip-flop FF–2 is the same as waveform *k* but is delayed one-quarter of a bit cell, as shown in FIG. 2*m*.

The limited information signal b is also applied to input terminal D of flip-flop FF–3 together with clock pulses *g* occurring at the 25 percent points in the bit cells. The output h from flip-flop FF–3 is as shown by waveform *h* in FIG. 2. The signal *h* is applied to the input D of flip-flop FF–4 together with the bit cell boundary clock pulse *c* to produce the waveform i shown in FIG. 2, which is the same as waveform *h* but is delayed three-fourths of a bit cell.

The waveform m has a value during a given bit cell period which represents the polarity of the input information signal existing at the 75 percent point during the preceding bit cell period. The waveform i has a value during a bit cell period which represents the polarity of the input information signal at the 25 percent point in the preceding bit cell period. By comparing the values of waveforms *m* and *i* during a given bit cell period, it is possible to determine whether a voltage transition occurred between the 25 and 75 percent points in the preceding bit cell period. If a polarity transition is detected, this indicates that a "1" information bit was recorded by a transition in the middle of the preceding bit cell.

Polarity transitions are detected by applying the outputs of flip-flops FF–2 and FF–4 to an exclusive "or" circuit 16 which produces an output *n*, representing the detection of a "1" information bit, when the signals *i* and *m* are different. The exclusive "or" circuit 16 includes two "and" gates A having outputs connected through an "or" gate 0.

The described decoding path 18 of the circuit of FIG. 1, including flip-flops FF–1 through FF–4 and the exclusive "or" circuit 16, is capable of correctly decoding an input information signal provided that the input signal is not distorted. However, when the magnetic recording medium is employed at very high speeds and with a very dense packing of the information bits, a distortion of the information signal often occurs.

When the information signal is passed through an equalizing, high-frequency emphasis circuit, the waveform can be made, as shown in FIG. 2*a*, to have accurately timed zero-crossing points. However, the input signal waveform may then include false zero-crossings in bit cells containing "0s" which are preceded and followed by bit cells containing "1s." This distortion in the information signal is illustrated by the dotted lines 14 and 15 in FIG. 2*a* showing that the signal may erroneously cross the zero axis and produce an erroneous pulse 20 and a notch 22 in the limited information signal *b* from the limiter 10. Consequently, the output n from "or" circuit 16 may include an erroneous "1" signal at the bit cell marked *x* in waveform *n* of FIG. 2.

A second decoding path 23, including flip-flops FF–5 and FF–6 and exclusive "or" circuit 24, is provided to suppress erroneous "1" signals in waveform *n* when the system is operated at high speeds and high packing densities. The limited information signal b is applied to flip-flop FF–5 together with the bit cell boundary clock pulses *c*. The output *d* from flip-flop FF–5 is applied to flip-flop FF–6 together with cell boundary clock pulses *c*. The signal *e* at the output of flip-flop FF–6 has a value representing the polarity of the information signal at the beginning of the preceding bit cell, and the signal d has a value representing the polarity of the information signal at the end of the preceding bit cell period. When these two signals *d* and *e* are applied to the exclusive "or" circuit 24, an output f is produced when the polarity of the input signal at the end of a bit cell is different from the polarity of the signal at the beginning of the bit cell. When such a difference in polarity exists, it is known that the preceding bit cell contained a "1."

The signal f from decoder path 23 and the signal *n* from decoder path 18 are applied to an "and" gate 28 which produces an NRZ (non-return-to-zero) output signal *p* as shown in FIG. 2*p*.

When the polarities of the information signal at the beginning and end of a bit cell are not different, the decoded signal f from the decoder path 23 is absent, indicating a "0" information bit. If an erroneous zero-crossing of the information signal results in an erroneous "1" output in signal *n* from decoder path 18, the absence of a "1" output in signal f from path 23 prevents the passage through "and" gate 28 of the erroneously detected "1" signal. The decoder output *p* thus provides an accurate decoding of the information and prevents an erroneous "1" output from a bit cell actually containing a "0" between preceding and following bit cells containing "1s."

DESCRIPTION OF FIGS. 3, 4 AND 5

Figure 3:
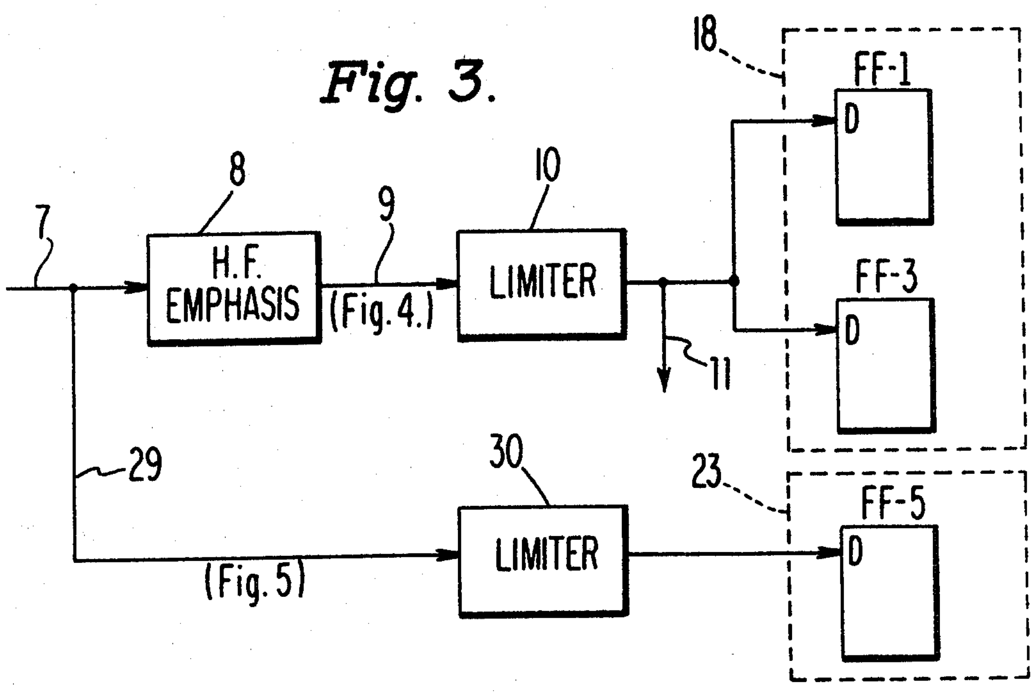
FIG. 3 is a diagram illustrating a modification of the signal input portion of the decoder of FIG. 1.
Figure 4:
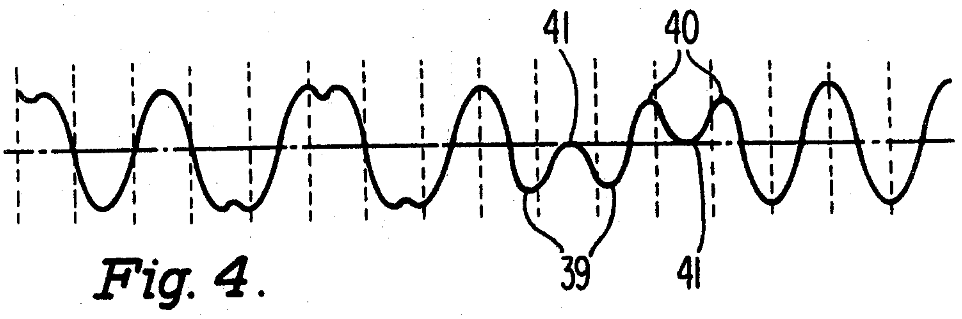
FIG. 4 illustrates a signal input waveform employed in the upper branch in FIG. 3.

FIG. 3 is a diagram of a modification that may be made to the input end of the decoding system of FIG. 1. The arrangement of FIG. 3 is the same as the arrangement of FIG. 1 in that the limiter 10 has its output connected to inputs of flip-flops FF–1 and FF–3. In FIG. 3 the input delay modulation information signal is shown as applied from an input signal line 7 through a high frequency emphasis circuit to the input 9 of limiter 10. An exemplary input information signal after high frequency emphasis may be as shown in FIG. 4, which is similar to FIG. 2*a*. The signal of FIG. 4, with high frequency emphasis, is seen to have zero axis crossings accurately positioned at the centers and boundaries of the information bit cells. However, the signal peaks at points 39 and 40 do not occur at the bit cell boundaries of respective cells containing a "0" between two "1s." Erroneous zero axis crossings may occur at points 41.

Figure 5:
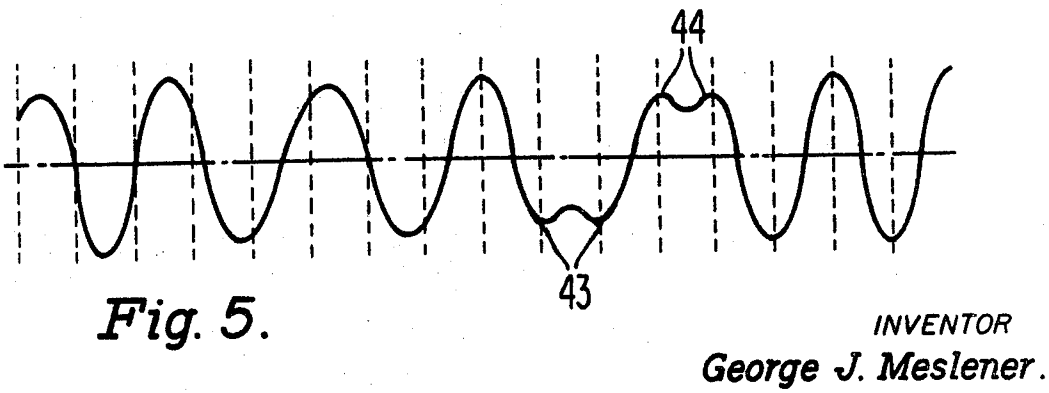
FIG. 5 is an example of a waveform employed in the lower branch in FIG. 3.

In FIG. 3, a second limiter 30 is provided having an input over line 29 to the input signal source at a point 7 prior to the high frequency emphasis circuit 8. The input information signal at the input limiter 30 may be as shown in FIG. 5. This signal is seen to have zero axis crossings which are not accurately positioned in relation to the centers and boundaries of the information bit cells. However, the input signal waveform of FIG. 5 has signal peaks 43 and 44, at the boundaries of respective cells containing "0"s between cells containing "1s,"which are accurately positioned at the boundaries of the information cells containing the "0s." Consequently, the waveform of FIG. 5 does not have erroneous zero axis crossings at the centers of 0-containing cells which are between 1-containing cells.

The system of FIG. 3 is different from the system of FIG. 1 in that the limited information signal from limiter 10 is applied solely to flip-flops FF–1 and FF–3, and the limited signal from limiter 30 is applied solely to flip-flop FF–5. The decoder branch path 18 using the waveform of FIG. 4 accurately decodes all "1" information bits, but may falsely generate "1" output signals due to an erroneous zero axis crossing at points 41. On the other hand, the decoder branch path 23 using the waveform of FIG. 5 accurately detects the equal polarities of cell margin points 43, and the equal polarities of cell margin points 44, as the margins of bit cells containing respective "0s"between cells containing "1s." Therefore, the false generation of a "1" signal in the upper branch path 18 of the decoding system is suppressed in the "and" gate 28 by the output of the lower branch path 23 of the system. The decoding system of FIG. 3 therefore is capable of operation with a higher degree of reliability, speed or packing density because the waveforms supplied to the two decoding branches are optimized for the type of decoding done in the two branches. The waveform of FIG. 4 is used for the detection of "1" transitions at the middle of bit cells, and the waveform of FIG. 5 is used for the detection of unequal polarity conditions at the boundaries of 1-containing bit cells. An output "1" is generated solely when both decoder branches detect a "1."

What is claimed is:

1. A decoder for an information signal in which a transition occurs at the center of a bit cell containing a "1" and a transition occurs at the boundary between two successive bit cells containing "0s," comprising
   - means to compare the polarities of the information signal just prior to and just following the center of a bit cell and generate a first decoded signal when the polarities are different,
   - means to compare the polarities of the information signal at the beginning and end of a bit cell and generate a second decoded signal when the polarities are different, and
   - means to "and" said first and second decoded signals to produce an NRZ output signal.

2. A decoder for an input information signal in which a transition occurs at the center of a bit cell containing a "1" and a transition occurs at the boundary between two successive bit cells containing "0s," comprising
   - a limiter,
   - means to a-c couple the input information signal to said limiter to produce a binary information signal having a given binary value when the input signal has a given polarity relative to zero volts,
   - means to compare the binary value of the binary information signal just prior to the center of a bit cell with the binary value of the signal just following the center of the bit cell, and generate a first decoded signal when the values are different,
   - means to compare the binary value of the binary information signal at the beginning of a bit cell with the binary value of the signal at the end of the bit cell, and generate a second decoded signal when the values are different, and
   - means to "and" said first and second decoded signals to produce an NRZ output signal.

3. A decoder according to claim 2 in which the comparisons made just prior to and just following the center of a bit cell are made at a quarter of a bit cell prior to and a quarter of a bit cell following the center of bit cell.

4. A decoder for an input information signal in which a transition occurs at the center of a bit cell containing a "1" and a transition occurs at the boundary between two successive bit cells containing "0s," comprising a first limiter, means to a-c couple the input information signal with high frequency emphasis to said first limiter to produce a first binary information signal having a given binary value when the input signal has a given polarity relative to zero volts, a second limiter, means to a-c couple the information signal without high frequency emphasis to said second limiter to produce a second binary information signal having a given binary value when the input signal has a given polarity relative to zero volts, means to compare the binary value of the first binary information signal a quarter of a bit cell prior to the center of the bit cell with the binary value of the signal a quarter of a bit cell following the center of the bit cell, and generate a first decoded signal when the values are different, means to compare the binary value of the second binary information signal at the beginning of a bit cell with the binary value of the signal at the end of a bit cell, and generate a second decoded signal when the values are different, and means to "and" said first and said second decoded signals to produce an NRZ output signal.

* * * * *